United States Patent
Pisklak et al.

(10) Patent No.: US 11,685,853 B2
(45) Date of Patent: Jun. 27, 2023

(54) NANOPARTICLE ALUMINA AS A CEMENT ACCELERATOR AND COMPRESSIVE STRENGTH ENHANCER

(71) Applicant: Halliburton Energy Services, Inc., Houston, TX (US)

(72) Inventors: Thomas Jason Pisklak, Cypress, TX (US); Stephanie Ruiz, Spring, TX (US); Claudia Carmen Pineda, Houston, TX (US); Aleksey V. Kolasnikov, Houston, TX (US); John Paul Bir Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/774,947

(22) Filed: Jan. 28, 2020

(65) Prior Publication Data

US 2021/0230469 A1 Jul. 29, 2021

(51) Int. Cl.
| | |
|---|---|
| *E21B 33/14* | (2006.01) |
| *C09K 8/487* | (2006.01) |
| *C09K 8/48* | (2006.01) |
| *C09K 8/473* | (2006.01) |
| *C04B 28/08* | (2006.01) |
| *C04B 14/30* | (2006.01) |
| *C04B 28/04* | (2006.01) |

(52) U.S. Cl.
CPC ............ *C09K 8/487* (2013.01); *C04B 14/303* (2013.01); *C04B 28/04* (2013.01); *C04B 28/08* (2013.01); *C09K 8/473* (2013.01); *C09K 8/48* (2013.01); *E21B 33/14* (2013.01); *C09K 2208/10* (2013.01)

(58) Field of Classification Search
CPC .......... C09K 8/473; C09K 8/48; C09K 8/487; C09K 8/467; C09K 8/493; C09K 8/46; C09K 2208/10; E21B 33/14; C04B 14/303; C04B 28/04; C04B 28/08; C04B 28/021

See application file for complete search history.

(56) References Cited

U.S. PATENT DOCUMENTS

| | | | |
|---|---|---|---|
| 5,553,670 A | 9/1996 | Cowan | |
| 7,559,369 B2 * | 7/2009 | Roddy | ................... C04B 28/02 166/280.2 |
| 7,913,757 B2 * | 3/2011 | Reddy | ................... C09K 8/428 166/250.01 |

(Continued)

FOREIGN PATENT DOCUMENTS

| | | | | |
|---|---|---|---|---|
| CN | 103553380 B | * | 1/2015 | .............. Y02P 40/10 |
| CN | 105370219 | | 7/2017 | |

(Continued)

OTHER PUBLICATIONS

Translation of CN 103553380B, obtained from EPO (Year: 2015).*

(Continued)

*Primary Examiner* — Angela M DiTrani Leff
(74) *Attorney, Agent, or Firm* — Thomas Rooney; C. Tumey Law Group PLLC (57) ABSTRACT

A method of cementing may include preparing a cement composition comprising: cementitious components comprising: a cement; a supplementary cementitious material; and nanoparticulate boehmite; and water; and introducing the cement composition into a subterranean formation.

5 Claims, 6 Drawing Sheets

(56) References Cited

U.S. PATENT DOCUMENTS

| | | | | |
|---|---|---|---|---|
| 10,875,810 B2* | 12/2020 | Fernandez | ............... | C04B 24/32 |
| 2011/0056411 A1* | 3/2011 | Schmidt | ................... | C04B 28/04 |
| | | | | 106/806 |
| 2012/0181034 A1 | 7/2012 | Bour et al. | | |
| 2014/0224156 A1* | 8/2014 | Baxter | .................... | C04B 28/04 |
| | | | | 106/816 |
| 2014/0290692 A1* | 10/2014 | Hall | ........................ | C09K 8/03 |
| | | | | 134/4 |
| 2014/0290958 A1* | 10/2014 | Marr | ...................... | C09K 8/524 |
| | | | | 166/311 |
| 2015/0021824 A1* | 1/2015 | Peters | .................... | C04B 28/021 |
| | | | | 264/299 |
| 2016/0298016 A1* | 10/2016 | Agapiou | ................. | E21B 33/14 |
| 2017/0073568 A1 | 3/2017 | Roddy | | |

FOREIGN PATENT DOCUMENTS

| | | | | |
|---|---|---|---|---|
| EP | 2767522 | | 8/2014 | |
| EP | 2767522 A2 * | | 8/2014 | ............ C04B 14/303 |
| FR | 3087769 A1 * | | 5/2020 | ............... C04B 7/32 |
| JP | 03-115148 | | 5/1991 | |
| WO | WO-2018156117 A1 * | | 8/2018 | |
| WO | WO-2020204959 A1 * | | 10/2020 | ............... C09K 8/46 |

OTHER PUBLICATIONS

Chowdhury, Soumya Sundar, Development of High Volume Fly Ash and/or Slag Modified Concrete and Geopolymer Concrete as Sustainable Construction Materials, 2011, West Virginia University The Research Repository @ WVU (Year: 2011).*

Wang, XiaoYong, "Properties prediction of fly ash blended concrete using hydration model," Sep. 2013, Science China, vol. 56, No. 9, 2317-2325 (Year: 2013).*

Soriano, Edgar, The Influence of Citric Acid on Setting Time and Temperature Behavior of Calcium Sulfoaluminate-Belite Cement, University of Arkansas, Fayetteville, 2019 (Year: 2019).*

Chidiac, et al. Compressive Strength Model for concrete, 2013, Magazine of Concrete Research, vol. 65, Issue 9 (Year: 2013).*

Shadizadeh et al. Experimental Investigation of Silica Fume as a Cement Extender for Liner Cementing in Iranian Oil/Gas Wells, Iranian Journal of Chemical Engineering, vol. 7, No. 1, 2010 (Year: 2010).*

Garcia-Mejia et al. Compressive Strength of Metakaoline-Based Geopolymers: Influence of KOH Concentration, Temperature, Time and Relative Humidity, 2016, Materials Sciences and Applications, 7, 772-791 (Year: 2016).*

Shuker et al. Laboratory Investigation on Performance of Cement Using Different Additives Schemes to Improve Early Age Compressive Strength, 2014, Research Journal of Applied Sciences, Engineering and Technology, 7(11), 2298-2305 (Year: 2014).*

Translation of FR 30877691, obtained from EPO (Year: 2020).*

International Search Report and Written Opinion for Application No. PCT/US2020/018653, dated Oct. 26, 2020.

Well cementing Second Edition, Erik B. Nelson, p. 49, dated 2006.

* cited by examiner

NANOPARTICLE ALUMINA AS A CEMENT ACCELERATOR AND COMPRESSIVE STRENGTH ENHANCER

BACKGROUND

Cement compositions are used in a variety of subterranean operations. For example, in subterranean well construction, a pipe string (e.g., casing, liners, expandable tubulars, etc.) can be run into a wellbore and cemented in place. The process of cementing the pipe string in place is commonly referred to as "primary cementing." In a typical primary cementing method, a cement composition can be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

In oil well cementing, a drill bit may be used to extend a wellbore through a subterranean formation. Oftentimes a wellbore is completed in stages whereby a first section of the wellbore is drilled, and a casing is cemented in place in the first section. After the cement has cured to form a hardened sheath, a second section of the wellbore may be drilled to further extend the wellbore and a casing is cemented in place in the second section. The drilling and cementing operations may be repeated multiple times until the wellbore reaches the desired depth.

One consideration when drilling the wellbore may be the time for the cement to cure between cementing and drilling operations. Typically, the drilling operation cannot continue until the cement has reached a target compressive strength, oftentimes defined by regulatory bodies or by a customer requirement. The curing time may be on the order of hours to days depending, for example, on the complexity of the cement operation, composition of the cement, and wellbore characteristics. The down time where drilling operations cannot continue may be referred to as wait on cement ("WOC"). Wait on cement is required to ensure proper zonal isolation in wellbores. Resuming drilling before the target compressive strength is reached may cause development of cracks within the cement sheath thereby potentially allowing fluid communication pathways to develop between the cement sheath and formation walls or within the cement sheath. Such fluid communication paths often require remediation through secondary cementing operations. Operators may design cement compositions that set relatively quickly after placement such that wait on cement time is minimized. Oftentimes supplementary cementitious materials are included in cement compositions to reduce the fraction of hydraulic cement, such as Portland cement, included in cement compositions. However, there may exist challenges with the rate of compressive strength development and ultimate compressive strength in reduced or low Portland cement compositions. Low-Portland cement compositions may have longer wait on cement time as compared to cement compositions which contain a larger fraction of Portland cement.

BRIEF DESCRIPTION OF THE DRAWINGS

These drawings illustrate certain aspects of some of the embodiments of the present method and should not be used to limit or define the present disclosure.

DETAILED DESCRIPTION

Disclosed herein are examples, which may relate to subterranean cementing operations and, in certain instances, to cement compositions comprising nanoparticle boehmite.

Cement compositions described herein may generally include a hydraulic cement, one or more supplementary cementitious materials, nanoparticle boehmite, and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III.

The hydraulic cement may be included in the cement composition in any amount suitable for a particular composition. Without limitation, the hydraulic cement may be included in the cement composition in an amount in the range of from about 10% to about 80% by weight of the cement composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement composition. In some examples, the cement composition may be considered a "low-Portland" cement where a Portland cement is present in an amount of 50% of less by weight of the cement composition. For example, the composition may include one or more hydraulic cements such as Portland cement in an amount of 50% or less by weight and the balance comprising one or more supplementary cementitious materials such as pozzolanic materials or inert materials including, but not limited to slag, fly ash, natural glasses, silica fume, diatomaceous earth, weighting materials, calcium carbonates, bio ashes, calcined clays, clays, shales, zeolites, and combinations thereof.

The water included in the cement composition may be from any source provided that it does not contain an excess of compounds that may undesirably affect other components in the cement composition. For example, a cement composition may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement composition in an amount in the range of from about 33% to about 200% by weight of the cement composition. For example, the water cement may be present in an amount ranging between any of and/or including any of about 33%, about 50%, about 75%, about 100%, about 125%, about 150%, about 175%, or about 200% by weight of the cement composition.

As mentioned above, the cement composition may include nanoparticulate boehmite. Boehmite is a natural mineral of aluminum oxide hydroxide. Boehmite may be known by several other names such as Boehmite alumina, monohydroxy aluminum oxide, aluminum oxide, AlOOH, γ-AlO(OH), AlO(OH), Al(OH)O, hydroxy(Oxo)alumane, aluminum hydroxide oxide, aluminum oxyhydroxide, and others. Boehmite may be naturally occurring or synthetically derived. In naturally occurring sources, boehmite may be found as a minor component of bauxite ore, for example Synthetic boehmite may be prepared by many different methods, including from reaction of aluminum alkoxide precursors with acids to form boehmite crystallites. As will be illustrated in greater detail below, boehmite may be included in cement compositions as an accelerator and to increase the ultimate compressive strength of the set cement composition.

Nanomaterials, including nanoparticulate boehmite, may have surface charges which may cause attraction between individual particulates of nanomaterials. These surface charges combined with large surface areas associated with nanomaterials may cause nanomaterials to form agglomerates either in solution or as a dry powder. As such, a sample of nanomaterial may not necessarily contain individual nanoparticles but rather may contain nanomaterial as agglomerates which may have particle sizes ranging from nano-scale to micron-scale. In the instance of nanoparticulate boehmite, certain solution conditions may cause agglomerates of nanoparticulate boehmite to disperse into individual nano-sized particulates or nano-sized agglomerates of boehmite In some examples, hydroxide may be present in a solution, such as in a cement, which may cause agglomerates of nanoparticulate boehmite to disperse into individual nano-sized particulates or as nano-sized agglomerates.

As used herein, nanoparticulate boehmite is defined to mean particulates of boehmite where at least one dimension of the boehmite is less than 1 micron in length. The boehmite included in the cement composition may be nanoparticulate boehmite. Nanoparticulate boehmite may have a mean particle size (d50) of about 1 nm to about 1000 nm. The mean particle size corresponds to d50 values as measured by commercially available particle size analyzers such as those manufactured by Malvern Instruments, Worcestershire, United Kingdom. Alternatively, the boehmite may have a mean particle size ranging between any of and/or including any of about of about 1 nm to about 100 nm, about 100 nm to about 200 nm, about 200 nm to about 300 nm, about 300 nm to about 400 nm, about 400 nm to about 500 nm, about 500 nm to about 600 nm, about 600 nm to about 700 nm, about 700 nm to about 800 nm, about 800 nm to about 900 nm, or about 900 nm to about 1000 nm. The nanoparticulate boehmite may be included in the cement composition in an amount ranging between any of and/or including any of about 0.01%, about 0.1%, about 0.2%, about 0.5%, about 0.8%, about 1%, about 2%, about 3%, about 4%, about 5%, or about 10% by weight of the cement composition.

As mentioned above, the cement composition may include supplementary cementitious materials. The supplementary cementitious material may be any material that contributes to the compressive strength of the cement composition, for example. In some examples, the cement composition may include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990.

In some examples, the cement composition may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

The cement composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on several factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, limestone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. Cement kiln dust may include a partially calcined kiln feed which is removed from the gas stream and collected in a dust collector during the manufacture of cement. The chemical analysis of CKD from various cement manufactures varies depending on several factors, including the particular kiln feed, the efficiencies of the cement production operation, and the associated dust collection systems.

In some examples, the cement composition may further include one or more of perlite, natural glass, shale, amorphous silica, or metakaolin as a supplementary cementitious material. Slag is generally a granulated, blast furnace by-product from the production of cast iron including the oxidized impurities found in iron ore. Natural glasses may include mineral species which are amorphous glasses such as volcanic rock, for example. The cement may further include perlite. Perlite is an ore and generally refers to a naturally occurring volcanic, amorphous siliceous rock including mostly silicon dioxide and aluminum oxide. The perlite may be expanded and/or unexpanded as suitable for a particular application. The expanded or unexpanded perlite may also be ground, for example. The cement may further include shale. A variety of shales may be suitable, including those including silicon, aluminum, calcium, and/or magnesium. Examples of suitable shales include vitrified shale and/or calcined shale. In some examples, the cement composition may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. Metakaolin may be an anhydrous calcined form of the clay mineral kaolinite.

Where used, one or more of the aforementioned supplementary cementitious materials may be present in the cement composition. For example, without limitation, one or more supplementary cementitious materials may be present in an amount of about 0.1% to about 80% by weight of the cement composition. For example, the any of the aforementioned supplementary cementitious materials may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement composition.

In some examples, the cement composition may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the cement composition, for example, to form a hydraulic composition with one or more supplementary cementitious materials. For example, the hydrated lime may be included in a supplementary cementitious material-to-hydrated-lime weight ratio of about 10:1 to about 1:1 or 3:1 to about 5:1. Where present, the hydrated lime may be included in the cement composition in an amount in the range of from about 10% to about 100% by weight of the cement composition, for example. In some examples, the hydrated lime may be present in an amount ranging between any of and/or including any of about 10%, about 20%, about 40%, about 60%, about 80%, or about 100% by weight of the cement composition.

Other additives suitable for use in subterranean cementing operations also may be included in embodiments of the cement composition. Examples of such additives include, but are not limited to weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In some examples, the cement composition may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement composition in an amount in the range of from about 0.01% to about 5% by weight of the cement composition. In specific examples, the dispersant may be present in an amount ranging between any of and/or including any of about 0.01%, about 0.1%, about 0.5%, about 1%, about 2%, about 3%, about 4%, or about 5% by weight of the cement composition.

In some examples, the cement composition may further include a set retarder. A broad variety of set retarders may be suitable for use in the cement composition. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement composition in an amount sufficient to delay the setting for a desired time. In some examples, the set retarder may be present in the cement composition in an amount in the range of from about 0.01% to about 10% by weight of the cement composition. In specific examples, the set retarder may be present in an amount ranging between any of and/or including any of about 0.01%, about 0.1%, about 1%, about 2%, about 4%, about 6%, about 8%, or about 10% by weight of the cement composition.

Cement compositions generally should have a density suitable for a particular application. By way of example, the cement composition may have a density in the range of from about 4 pounds per gallon ("lbm/gal") (1677.6 kg/m$^3$) to about 20 lbm/gal (2369.5 kg/m$^3$). In certain embodiments, the cement composition may have a density in the range of from about 8 lbm/gal (958.6 kg/m$^3$) to about 17 lbm/gal (2037 kg/m$^3$) or about 8 lbm/gal (958.6 kg/m$^3$) to about 14 lbm/gal (1677.6 kg/m$^3$). Examples of the cement compositions may be foamed or unfoamed or may comprise other means to reduce their densities, such as hollow microspheres, low-density elastic beads, or other density-reducing additives known in the art. In examples, the density of the cement composition may be reduced prior to placement in a subterranean formation.

In some examples, the cement compositions may set to have a desirable compressive strength after activation. Compressive strength is generally the capacity of a material or structure to withstand axially directed pushing forces. The compressive strength may be measured at a specified time after the cement composition has been mixed and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2 "Testing Well Cements", 2nd Edition. Published April 2013.

By way of example, the cement compositions may develop a 24-hour compressive strength in the range of from about 50 psi (345 kPa) to about 5000 psi (34473 kPa), alternatively, from about 100 psi (689 kPa) to about 4500 psi (31026 kPa), or alternatively from about 500 psi (3447 kPa) to about 4000 psi (27579 kPa). In some examples, the cement composition may develop a compressive strength in 24 hours of at least about 50 psi (345 kPa), at least about 100 psi (689 kPa), at least about 500 psi (3447 kPa), or more. In some examples, the compressive strength values may be determined using destructive or non-destructive methods at a temperature ranging from 100° F. (37° C.) to 200° F. (93° C.).

The cement composition may have desirable thickening times after activation. Thickening time typically refers to the time a fluid, such as the cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. (10° C.) to about 400° F. (204° C.), alternatively, in a range of from about 80° F. (26.6° C.) to about 250° F. (121° C.), and alternatively at a temperature of about 140° F. (60° C.).

Figure 1:
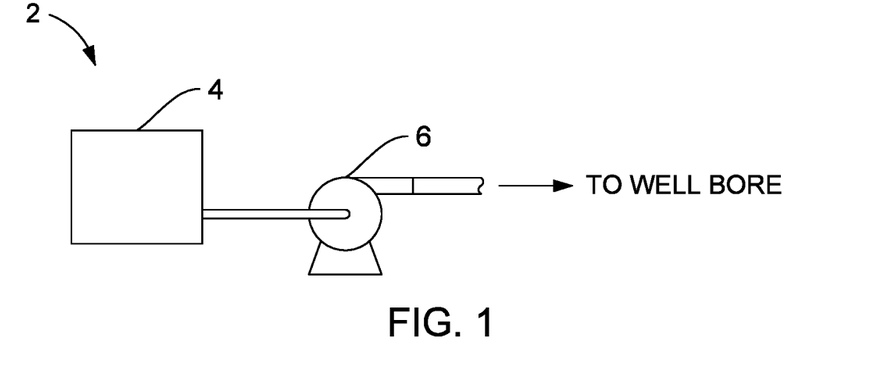
FIG. 1 illustrates a system for the preparation and delivery of a cement composition to a wellbore in accordance with certain embodiments.

Referring now to FIG. 1, the preparation of a cement composition in accordance with example embodiments will now be described. FIG. 1 illustrates a system 2 for the preparation of a cement composition and subsequent delivery of the composition to a wellbore in accordance with certain embodiments. The cement composition may be prepared according to any method disclosed herein. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks. In some embodiments, a jet mixer may be used, for example, to continuously mix cement components with the water as it is being pumped to the wellbore. In embodiments, a re-circulating mixer and/or a batch mixer may be used to mix the cement composition and cement additives.

Figure 2:
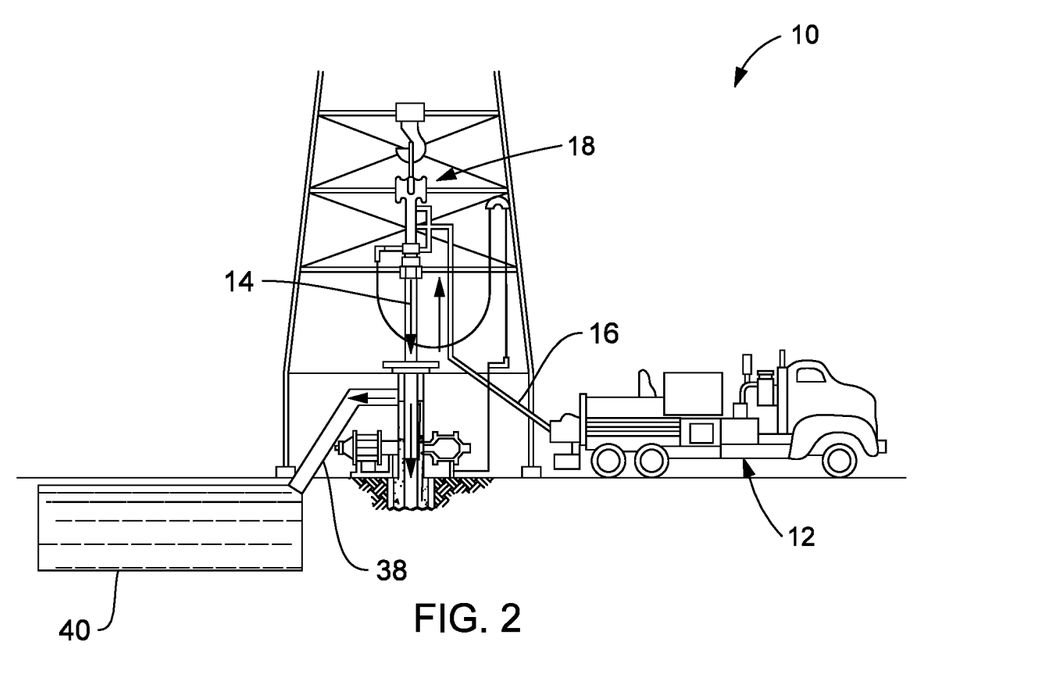
FIG. 2 illustrates surface equipment that may be used in the placement of a cement composition in a wellbore in accordance with certain embodiments.

An example technique for placing a cement composition into a subterranean formation will now be described with reference to FIGS. 2 and 3. FIG. 2 illustrates surface equipment 10 that may be used in placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1). The cementing unit 12 may pump a cement composition 14 through a feed pipe 16 and to a cementing head 18 which conveys the cement composition 14 downhole.

Figure 3:
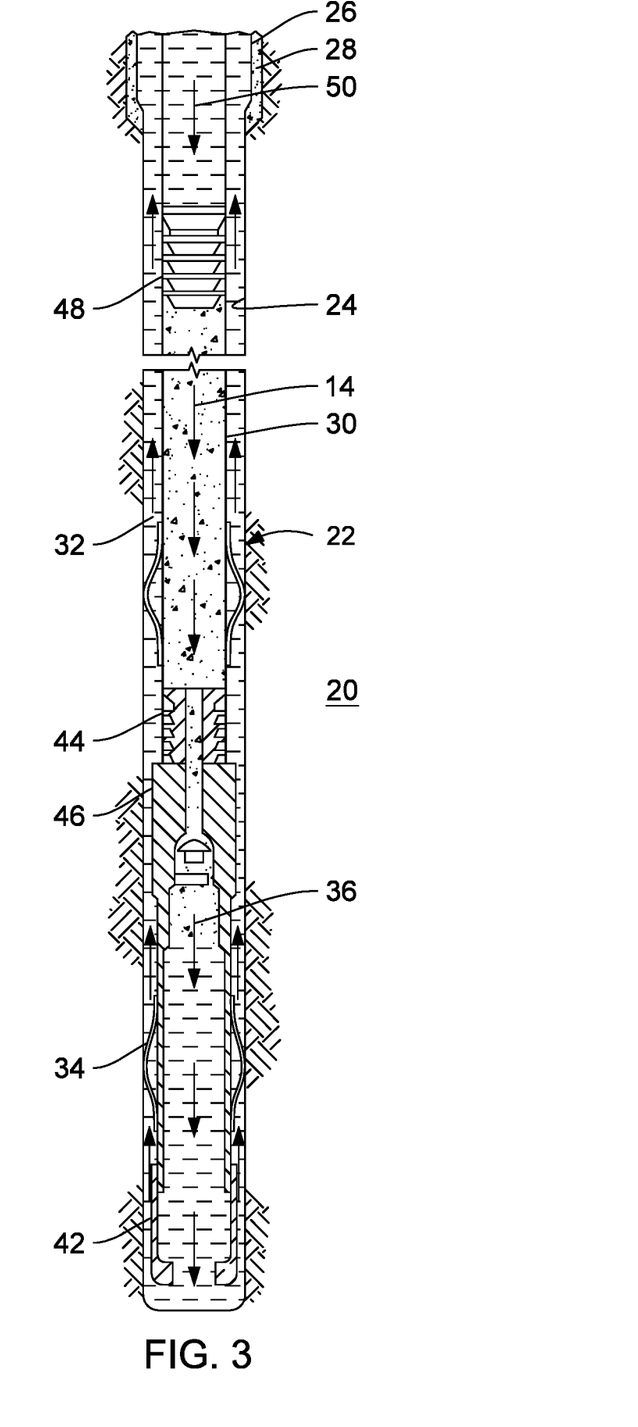
FIG. 3 illustrates the placement of a cement composition into a wellbore annulus in accordance with certain embodiments.

Turning now to FIG. 3, the cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 3, the bottom plugs 44 is shown on the landing collar 46. In the illustrated embodiment, a top plug 48 may be introduced into the wellbore 22 behind the cement composition 14. The top plug 48 may separate the cement composition 14 from a displacement fluid 50 and push the cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slick line, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydro mechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, the present disclosure may provide methods, systems, and apparatus that may relate to methods of designing cement compositions. The methods, systems. and apparatus may include any of the various features disclosed herein, including one or more of the following statements.

Statement 1. A method of cementing comprising: preparing a cement composition comprising: cementitious components comprising: a hydraulic cement; a supplementary cementitious material; and nanoparticulate boehmite; and water; and introducing the cement composition into a subterranean formation.

Statement 2. The method of statement 1 wherein the hydraulic cement is present in an amount of 50% by weight or less of the cementitious components.

Statement 3. The method of any of statements 1-2 wherein the cement is selected from the group consisting of Portland cements, pozzolana cements, gypsum cements, high alumina content cements, silica cements, and, combinations thereof.

Statement 4. The method of any of statements 1-3 wherein the supplementary cementitious material is selected from the group consisting of fly ash, blast furnace slag, silica fume, natural glasses, kiln dust, clay, and combinations thereof.

Statement 5. The method of any of statements 1-4 wherein the nanoparticulate boehmite has a particle size of about 1 nm to about 1000 nm and wherein the nanoparticulate boehmite is present in an amount of about 0.01% to about 10% by weight of the cementitious components.

Statement 6. The method of any of statements 1-5 wherein the cement composition further comprises a material selected from the group consisting weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof.

Statement 7. The method of any of statements 1-6 wherein the hydraulic cement is Portland cement, the supplementary cementitious material comprises slag and fly ash.

Statement 8. The method of any of statements 1-7 wherein the hydraulic cement comprises Portland cement, wherein the Portland cement is present in an amount less than 50% by weight of the cementitious components, wherein the supplementary cementitious material comprises fly ash, wherein the nanoparticulate boehmite has a particle size of about 500 nm to about 1000 nm in solution, and wherein nanoparticulate boehmite is present in an amount of about 1% to about 5% by weight of the cementitious components.

Statement 9. A cement composition comprising: cementitious components comprising: a cement; a supplementary cementitious material; and nanoparticulate boehmite; and water.

Statement 10. The composition of statement 9 wherein the cement is present in an amount of 50% by weight or less of the cementitious components.

Statement 11. The composition of any of statements 9-10 wherein the cement is selected from the group consisting of Portland cements, pozzolana cements, gypsum cements, high alumina content cements, silica cements, and, combinations thereof.

Statement 12. The composition of any of statements 9-11 wherein the supplementary cementitious material is selected from the group consisting of fly ash, blast furnace slag, silica fume, natural glasses, kiln dust, clay, and combinations thereof.

Statement 13. The composition of any of statements 9-12 wherein the nanoparticulate boehmite has a particle size in a range of about 1 nm to about 1000 nm.

Statement 14. The composition of any of statements 9-11 wherein the nanoparticulate boehmite is present in an amount of about 0.01% to about 10% by weight of the cementitious components.

Statement 15. The composition of any of statements 9-12 further comprising a material selected from the group consisting weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof.

Statement 16. A method comprising: providing a wellbore temperature and a time dependent compressive strength requirement; selecting a concentration of nanoparticulate boehmite wherein selecting a concentration of nanoparticulate boehmite comprises inputting the wellbore temperature and the time dependent compressive strength requirement into a boehmite concentration function and returning a concentration of nanoparticulate boehmite; individually selecting a concentration of a cement, a concentration a supplementary cementitious material, and a concentration water; and preparing a cement composition comprising: cementitious components comprising: the cement; the supplementary cementitious material; the nanoparticulate boehmite; and the water, wherein the cement, the supplementary cementitious material, the nanoparticulate boehmite, and the water are present in the cement composition in the selected concentrations.

Statement 17. The method of statement 16 wherein the nanoparticulate boehmite has a particle size in a range of about 1 nm to about 1000 nm.

Statement 18. The method of any of statements 16-17 wherein the cement is selected from the group consisting of Portland cements, pozzolana cements, gypsum cements, high alumina content cements, silica cements, and, combinations thereof.

Statement 19. The method of any of statements 16-18 wherein the cement is present in an amount of 50% by weight or less of the cementitious components.

Statement 20. The method of any of statements 16-19 wherein the supplementary cementitious material is selected from the group consisting of fly ash, blast furnace slag, silica fume, natural glasses, kiln dust, clay, and combinations thereof.

Example 1

The following example illustrates a control experiment where a typical low-Portland cement composition was prepared and tested. The physicochemical properties of a sample of Boehmite were analyzed and are presented in Table 1, Table 2, and Table 3. As discussed above, nanoparticulate boehmite may form agglomerates that are nano-sized to micron-sized as indicated by the particle size distribution shown in Table 2. A cement composition (cement composition 1) was prepared according to the formulation presented in Table 4. In Table 4 BWOB is by weight of blend, i.e. the dry cementitious components of the cement composition. The cementitious components sum to 100% by weight of blend and the quantity of additives such as defoamer are measured against the cementitious components. Additionally, BVOB is by volume of blend where the water is measured as a volume of the blend of dry cementitious components.

TABLE 1

| Boehmite Specific Gravity (g/cm$^3$) | 4.03 |
| Boehmite Bulk Density (kg/m$^3$) | 586.27 |
| Boehmite Water Requirement | 153 |

TABLE 2

| Particle Size Distribution (μm) | | |
| --- | --- | --- |
| D10 | D50 | D90 |
| 1.6 | 5.9 | 17.9 |

TABLE 3

| Oxide Analysis | | |
| --- | --- | --- |
| $Al_2O_3$ | $TiO_2$ | $P_2O_5$ |
| 99.5 | 0.2 | 0.3 |

The components were dry blended and then mixed to form cement composition 1 utilizing American Petroleum Institute (API) procedures outlined in API RP 10B-2 "Testing Well Cements", 2nd Edition. Published April 2013. Cement composition 1 was prepared with a density of 13.3 pounds per gallon (ppg) (1593.69 kg/m$^3$). After mixing, cement composition 1 was introduced into an ultrasonic cement analyzer (UCA) at 3000 psi (20684.27 kPa) and 180° F. (82.2° C.) for 72 hours.

TABLE 4

| Concentration | Material |
| --- | --- |
| 100% BWOB | |
| 31.3% | Type I/II Cement |
| 43.5% | Fly Ash |
| 25.2% | Slag |
| 0.10% BWOB | Suspension Additive |
| 0.25% BWOB | Defoamer |
| 0.50% BWOB | Fluid Loss Additive |
| 63.6% BVOB | Fresh Water |

A cement composition (cement composition 2) was prepared according to the formulation presented in Table 5. Cement composition 2 was prepared with 5% boehmite replacement of slag in the dry blend with a density of 13.3 pounds per gallon (ppg) (1593.69 kg/m$^3$). After mixing, cement composition 2 was introduced into an ultrasonic cement analyzer (UCA) at 3000 psi (20684.27 kPa) and 180° F. (82.2° C.) for 72 hours.

TABLE 5

| Concentration | Material |
| --- | --- |
| 100% BWOB | |
| 31.3% | Type I/II Cement |
| 43.5% | Fly Ash |
| 20.2% | Slag |
| 5.0% | Boehmite |
| 0.10% BWOB | Suspension Additive |
| 0.25% BWOB | Defoamer |
| 0.50% BWOB | Fluid Loss Additive |
| 63.6% BVOB | Fresh Water |

Figure 4:
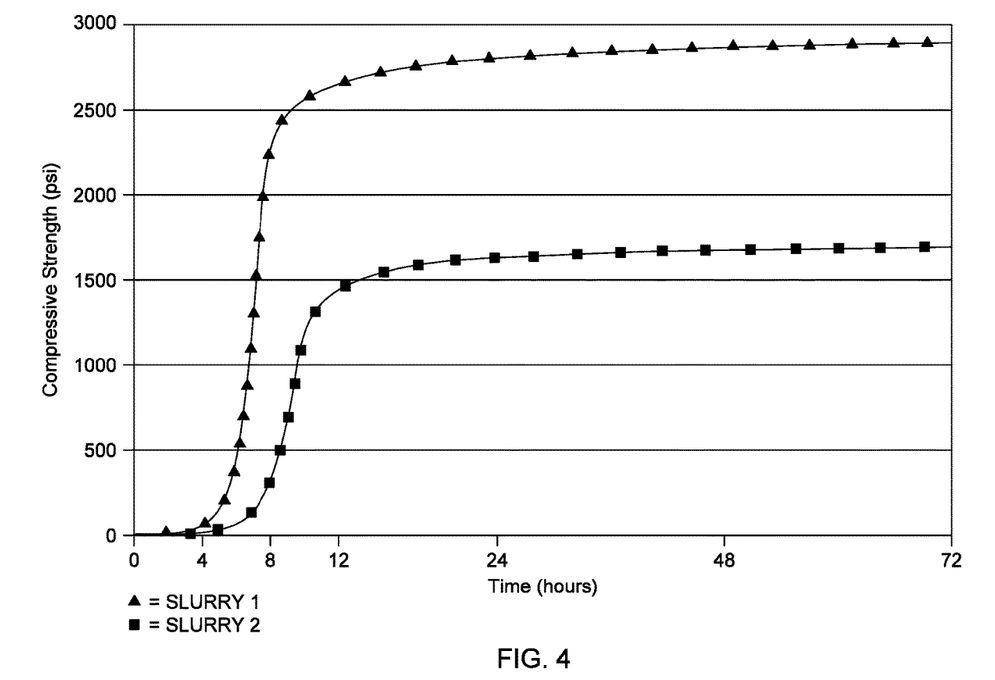
FIG. 4 is a graph showing results of an ultrasonic cement analyzer experiment.

The UCA data from cement composition 1 and cement composition 2 are plotted in Table 6. It was observed that a 5% replacement of slag with nanoparticulate boehmite in the cement composition increased the rate of strength development to 50 psi (344.7 kPa) and yielded a higher ultimate compressive strength. It was observed that the time to 50 psi was reduced from 374 minutes to 249 minutes from cement composition 1 to cement composition 2. It was further observed that the 24 hour and 72 hour compressive strength was increased by about 45% with the addition of boehmite from cement composition 1 to cement composition 2. The UCA test data from Example 1 is also illustrated graphically in FIG. 4.

TABLE 6

|  | Time to 50 psi (hh:mm) | 24 hr CS (psi) (kPa) | 72 hr CS (psi) (kPa) |
|---|---|---|---|
| Cement composition 1 | 6:14 | 1500 (10342) | 1623 |
| Cement composition 2 | 4:09 | 2687 (18526) | 2841 |

Example 2

A cement composition was prepared according to Table 5, and API procedures outlined in API RP 10B-2. The components were dry blended and then mixed with water in a blender and introduced into a FANN Instruments HPHT testing apparatus. A cement thickening time test was performed at 140° F. and 3000 psi with a ramp time of 30 minutes. The thickening time results are shown in Table 7. The units Bc are Bearden units of consistency. It was observed that the time to 70 Bc for slurry 2 cement composition containing 5% Boehmite was 6 hours and 15 minutes.

TABLE 7

|  | 50 Bc | 70 Bc | 100 Bc |
|---|---|---|---|
| Time (hh:mm) | 04:07 | 06:15 | 07:31 |

Example 3

Cement composition 3 was prepared according to the formulation presented in Table 8 and cement composition 4 was prepared according to the formulation presented in Table 9. In cement composition 4, a portion of the hydraulic cement is replaced by boehmite. The components were dry blended and then mixed with water to form cement slurries 3 and 4 utilizing procedures outlined in API RP 10B-2. Cement composition 3 and 4 were prepared with a density of 13.0 pounds per gallon (ppg) (1 557.74 kg/m$^3$). After mixing, cement composition 3 and 4 were individually introduced into an ultrasonic cement analyzer (UCA) at 3000 psi (20684.27 kPa) and 100° F. (37.8° C.) for 72 hours.

TABLE 8

| Concentration | Material |
|---|---|
| 100% BWOB | |
| 45.0% | Type I/II Cement |
| 27.5% | Fly Ash |
| 27.5% | Pozzolanic Material |
| 0.1% BWOB | Suspension Additive |
| 0.3% BWOB | Defoamer |
| 0.6% BWOB | Fluid Loss Additive |
| 72.7% BVOB | Fresh Water |

TABLE 9

| Concentration | Material |
|---|---|
| 100% *BWOB | |
| 44.5% | Type I/II Cement |
| 27.2% | Fly Ash |
| 27.2% | Pozzolanic Material |
| 1.0% | Boehmite |
| 0.1% BWOB | Suspension Additive |
| 0.3% BWOB | Defoamer |
| 0.5% BWOB | Fluid Loss Additive |
| 72.3% BVOB | Fresh Water |

Figure 5:
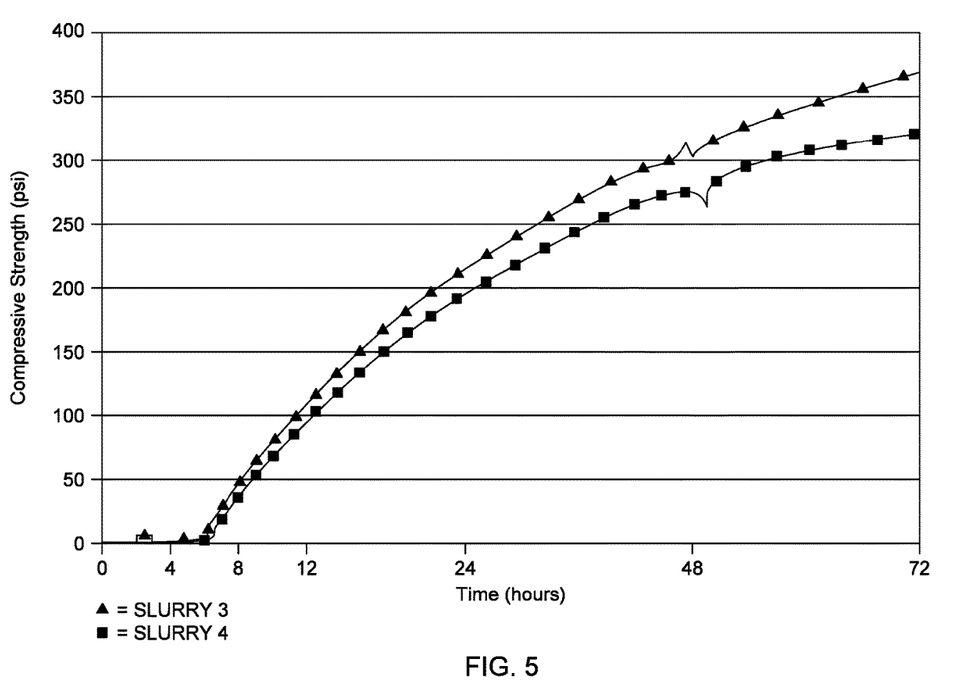
FIG. 5 is a graph showing results of an ultrasonic cement analyzer experiment.

The results of the UCA test of cement composition 3 and cement composition 4 are shown in Table 10 and graphically in FIG. 5. It was observed that substituting 1% of the hydraulic cement with nanoparticulate boehmite in cement composition 4 increased the compressive strength development and accelerated the rate of compressive strength increase. It was observed that the time to 500 psi was about 11% quicker in cement composition 4 containing boehmite as compared to cement composition 3 without boehmite. Further, it was observed that the addition of boehmite increased the ultimate compressive strength by approximately 8.3%.

TABLE 10

|  | Time (hh:mm) | | |
|---|---|---|---|
|  | 50 psi (344.7 kPa) | 250 psi (1723.7 kPa) | 500 psi (3447.4 kPa) |
| Cement composition 3 | 09:29 | 42:22 | 115:35 |
| Cement composition 4 | 08:37 | 33:20 | 103:18 |

Example 4

In this example, a design of experiment to determine the effects of boehmite concentration on time to 50 psi for a low-Portland cement composition was performed. Cement composition 1 from Table 4 was selected as the baseline slurry to begin the design of experiment. The cement slurries were formulated by substituting boehmite in place of slag in cement composition 1 while keeping fractions of the other cement components the same. The tested slurries are shown in Table 11. Each formulation was dry blended and mixed with water according to procedure outlined in API RP 10B-2. Each slurry was mixed to a density of 13.3 pounds per gallon (ppg) (1593.69 kg/m$^3$). After preparation, each cement composition was introduced into a UCA and tested at 3000 psi (3447.38 kPa) and the temperature indicated in Table 11.

TABLE 11

|  | Temperature ° F. (° C.) | Boehmite % BWOB | UCA Time to 50 psi (min) |
|---|---|---|---|
| Cement composition 5 | 100 (37.7) | 3 | 805 |
| Cement composition 6 | 140 (60) | 3 | 447 |
| Cement composition 7 | 180 (82.2) | 3 | 280 |
| Cement composition 8 | 100 (37.7) | 1 | 837 |
| Cement composition 9 | 180 (82.2) | 5 | 249 |
| Cement composition 10 | 80 (26.7) | 0 | 1384 |
| Cement composition 11 | 80 (26.7) | 5 | 1076 |

TABLE 11-continued

|  | Temperature °F. (°C.) | Boehmite % BWOB | UCA Time to 50 psi (min) |
|---|---|---|---|
| Cement composition 12 | 220 (104.4) | 0 | 301 |
| Cement composition 13 | 220 (104.4) | 5 | 240 |
| Cement composition 14 | 180 (82.2) | 0 | 374 |

Figure 6:
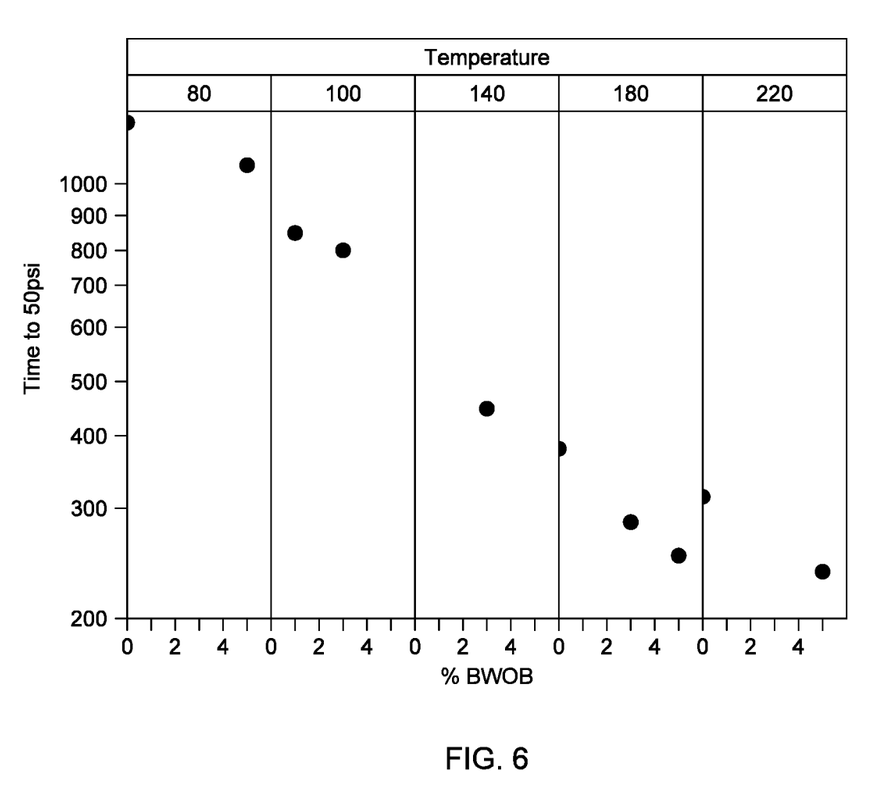
FIG. 6 a plot showing results of an ultrasonic cement analyzer experiment.

The results of the UCA testing from Example 4 is shown graphically in FIG. 6. In FIG. 6, the time to 50 psi is shown on a log scale on the vertical axis as a function of boehmite concentration (% BWOB) at each temperature tested. It was observed that an increase in temperature decreased the time to 50 psi for each cement composition regardless of boehmite concentration. It was further observed that increasing boehmite concentration reduced the time to 50 psi at each tested temperature.

From the results of Example 4 its can be observed that the time to 50 psi may have an Arrhenius dependence on temperature. As such, the logarithm of time to 50 psi may be written as a function of temperature and concentration of boehmite as illustrated in Equation 1.

$$Ln(t_{50psi}) = I + E\left(\frac{1}{T}\right) - aC \quad (1) \qquad \text{Equation 1}$$

Where:
T=Temperature in Kelvin;
C=concentration in % BOWB Boehmite; and
I, E, and α are constants.

Figure 7:
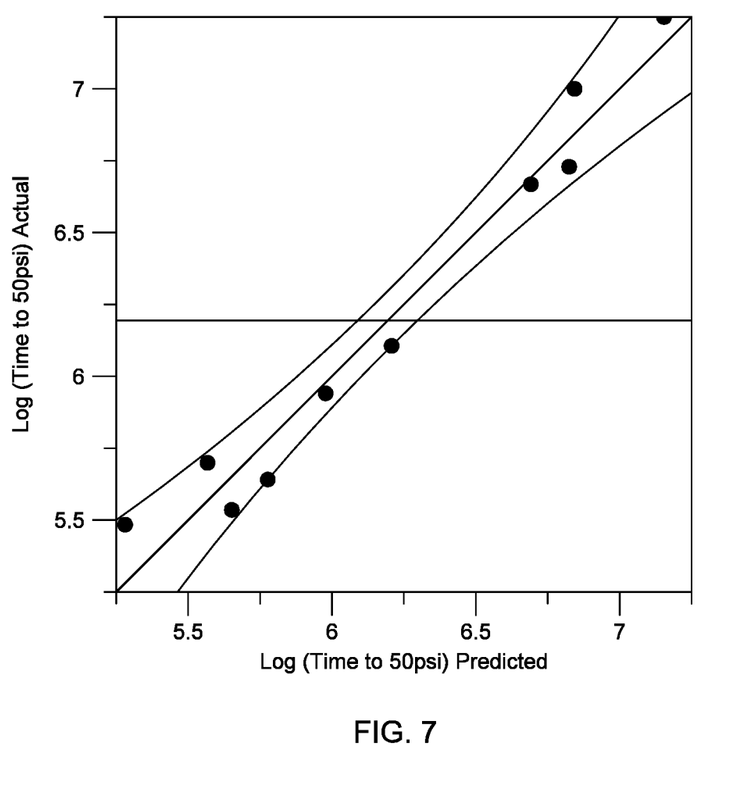
FIG. 7 is parity plot comparing a cement model to observed results.

Equation 1 may be utilized to predict the effects of temperature and boehmite concentration on the initial setting of a cement composition. FIG. 7 is a parity plot of observed log of time to reach 50 psi versus the predicted log of time to 50 psi calculated from Equation 1. It can be observed that predicted log of time to 50 psi from Equation 1 fits the observed log of time to 50 psi from Example 4.

While Equation 1 represents one embodiment a model of the relationship between time to 50 psi as function of temperature and concentration of boehmite, there may be other models which also may be utilized to predict the time to 50 psi, or, time to any arbitrary psi. For example, such a model may have the general form of Equation 2.

$$t_{50psi} = If_1(T)f_2(C)f_3(T \cdot C)f_4\left(\frac{T}{C}\right) \quad (2) \qquad \text{Equation 2}$$

In Equation 2, $f_1$, $f_2$, $f_3$, and $f_4$ may be functions of temperature or boehmite concentration or a function of a combination of temperature and boehmite concentration. Functions $f_1$, $f_2$, $f_3$, and $f_4$ may be any type of functions including, but not limited to, exponential, power law, trigonometric, polynomial, or combinations thereof. The functions may be fit to data using a regression model, for example. While Equation 2 relates time to 50 psi as a function of temperature and boehmite concentration, in principle, the time to any arbitrary psi may be defined which. Equations 1 and 2 may be considered boehmite concentration functions as they relate the time to an arbitrary compressive strength as a function of boehmite concentration and temperature. A cement composition may be designed utilizing Equation 1 or Equation 2.

A boehmite concentration function may be defined for any arbitrary cement composition utilizing the methods above. For example, a boehmite concentration function may be defined by a method including the following steps: providing a proposed cement composition including cement, a supplementary cementitious material, and water, utilizing a design of experiment to define a plurality of test compositions that vary a concentration of boehmite in the proposed cement composition, testing each of the plurality of test compositions at varying temperatures to generate compressive strength data over time, and utilizing a regression analysis to define a boehmite concentration function based on the compressive strength data. The boehmite concentration function may be applicable to the time dependent compressive strength selected to define the boundary values of the boehmite concentration function such as time to 50 psi. The boehmite concentration function could be further defined to any compressive strength such as time to 50 psi, time to 250 psi, time to 500 psi, or any other arbitrary compressive strength value.

The boehmite concentration function may be utilized to design a cement composition. For example, a wellbore temperature and a time dependent compressive strength requirement, such as time to 50 psi, for example, may be provided or defined. A boehmite concentration function that defines time to 50 psi as a function of boehmite concentration and temperature may then be selected. The time to 50 psi and wellbore temperature may then be input into the selected boehmite concentration function which may then output a boehmite concentration that will yield a cement composition that has the property of reaching 50 psi compressive strength at the defined time and temperature. The cement composition may then be prepared and verified using destructive or non-destructive testing methods.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:

providing a wellbore temperature and a time dependent compressive strength requirement;

selecting a concentration of nanoparticulate boehmite wherein selecting a concentration of nanoparticulate boehmite comprises inputting the wellbore temperature and the time dependent compressive strength requirement into the following equation:

$$t_{50\,psi} = If_1(T)f_2(C)f_3(T \times C)f_4\left(\frac{T}{C}\right)$$

where $t_{50\,psi}$ is time to 50 psi compressive strength, I is a constant, $f_1$ is a function of temperature, $f_2$ is a function of boehmite concentration, $f_3$ and $f_4$ are functions of temperature and boehmite concentration, C is the concentration of nanoparticulate boehmite, and T is temperature, and returning a concentration of nanoparticulate boehmite, wherein $f_1$, $f_2$, $f_3$, and $f_4$ are polynomial functions; individually selecting a concentration of a cement, a concentration of a supplementary cementitious material, and a concentration of water;

preparing dry blend comprising:

the cement;

the supplementary cementitious material; and the nanoparticulate boehmite;

wherein the cement, the supplementary cementitious material, and the nanoparticulate boehmite, are present in the dry blend in the selected concentrations;

preparing a cement composition by blending the dry blend with water in the selected concentration of water;

introducing the cement composition into an annulus formed between a subterranean formation and a pipe string disposed in a wellbore in the subterranean formation; and setting the cement composition in the annulus to support the pipe string.

2. The method of claim 1 wherein the nanoparticulate boehmite has a particle size in a range of about 1 nm to about 1000 nm.

3. The method of claim 1 wherein the cement is selected from the group consisting of Portland cements, pozzolana cements, gypsum cements, high alumina content cements, silica cements, and combinations thereof.

4. The method of claim 1 wherein the cement is present in an amount of 50% by weight or less of the cementitious components.

5. The method of claim 1 wherein the supplementary cementitious material is selected from the group consisting of fly ash, blast furnace slag, silica fume, natural glasses, kiln dust, clay, and combinations thereof.

* * * * *